Sept. 2, 1941.  C. S. ASH  2,254,198
DUAL WHEEL ASSEMBLY
Filed June 7, 1939
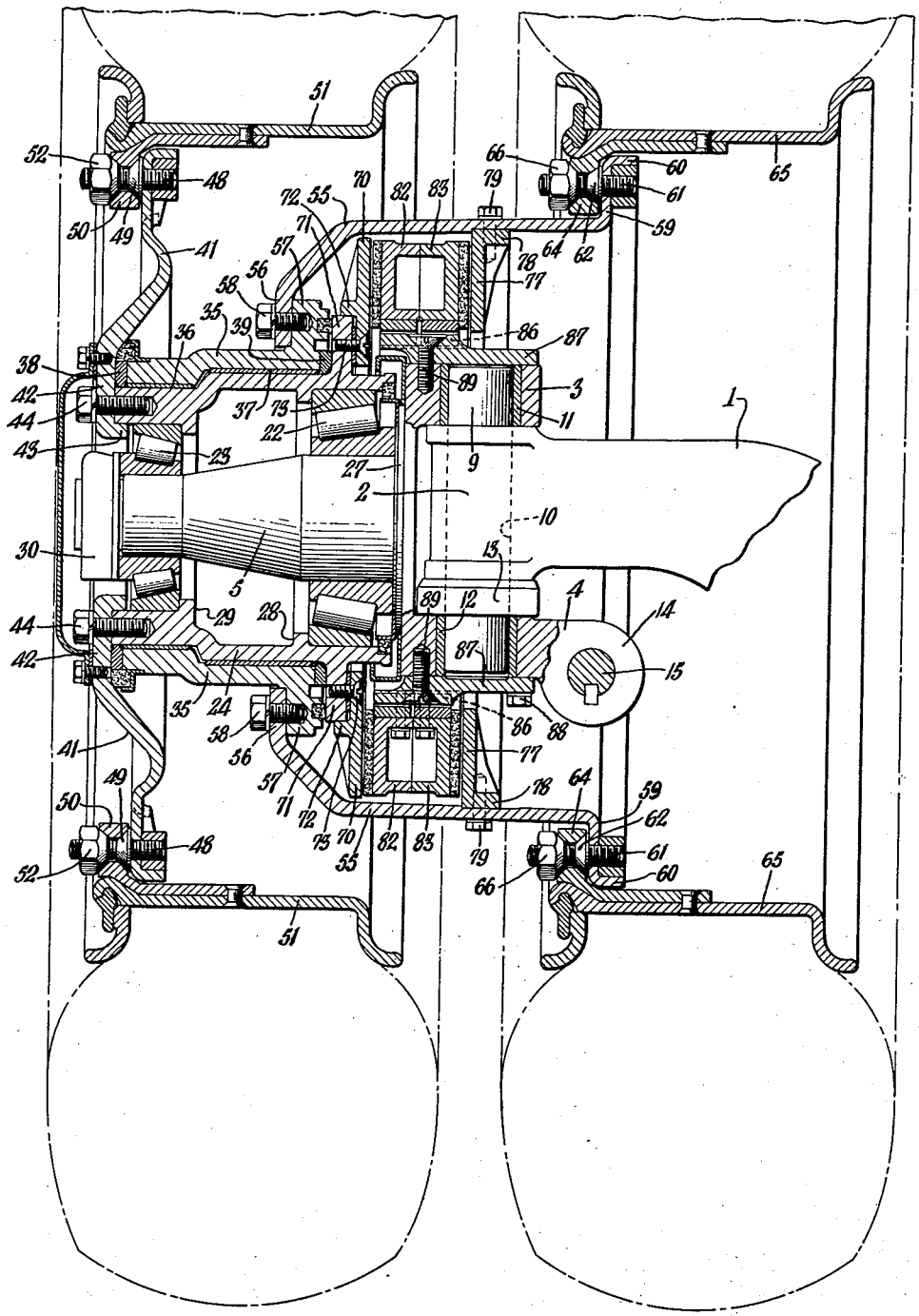
INVENTOR
Charles S. Ash
BY
Morgan, Finnegan & Durham
ATTORNEYS Patented Sept. 2, 1941

2,254,198

UNITED STATES PATENT OFFICE 2,254,198

DUAL WHEEL ASSEMBLY

Charles S. Ash, Milford, Mich.

Application June 7, 1939, Serial No. 277,869

4 Claims. (Cl. 301—5)

The invention relates to new and useful improvements in wheels and dual wheel structures, their assemblies, and more particularly to new and useful improvements of the kind described particularly designed and capacitated for use in heavy duty vehicles.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawing, referred to herein and constituting a part hereof, illustrates one embodiment of the invention, and together with the description, serves to explain the principles of the invention.

The accompanying drawing is a vertical section through a dual wheel assembly exemplarily embodying the invention.

Objects of the invention are to provide a dual wheel assembly which is unusually strong and relatively light, with ample space for bearings, which maintains the requisite running balance while holding weight to a minimum and at the same time realizing the other enumerated advantages; to provide such a duel wheel assembly adapted and capacitated for heavy duty, as in trucks, buses, trailers and the like, and which in certain of its features is especially adapted and capacitated to serve for dirigible front wheel assemblies; to provide in dual wheel assemblies novel wheel constructions especially capacitated to realize the stated and other objects and advantages; to provide composite wheels having strong and ample hub structures and bearings, and having bodies wherein the character, form, weight and disposition of the metal all contribute to realize the above stated and other objects and advantages, to provide such wheels of simple and strong structure, which are easy and economical to manufacture and to assemble, and employing kinds of material and forms of construction best adapted to realize the purposes of the invention. To these ends wheels are provided having cast metal hubs of ample breadth and diameter, so that the hubs may be nested for compactness and also have ample bearing surfaces to properly and efficiently carry their loads, and having wheel bodies or webs formed as tapered steel discs, fixed to their respective hubs, the metal of the discs being thicker at the hubs and tapered outwardly toward the rims, the only castings used in connection with the wheels being the hubs. The taper will in many cases be uniform, that is, the thickness of the metal will decrease uniformly outwardly from the central aperture. The wheels are shaped to meet the particular requirements, and in the case of dirigible front wheel assemblies, the body of the inner wheel is relatively deeply dished inwardly from its attachment to the hub so that the downward projection of the king pin axis will be between the treads of the two wheels, and preferably also braking means for the dual wheels will be effectively housed within the inner wheel body.

Referring now in detail to the embodiment of the invention illustrated by way of example in the accompanying drawing, a dual wheel assembly is shown applied to one end of a front axle of a vehicle. An axle beam 1 is equipped at either end with a knuckle 2, which is embraced between arms 3 and 4 of a yoke formed on the inner end of, and integral with, a spindle 5, upon which spindle the dual wheels are journaled as hereinafter described. Spindle 5 is mounted by means of said yoke and knuckle to turn on an approximately vertical axis, with proper allowances for caster and camber, as desired, and for this purpose a king pin 9 is mounted in an approximately vertically-disposed aperture 10 in the knuckle 2, and at either end the king pin projects into corresponding apertures formed in the top and bottom yoke arms 3 and 4 of the spindle. The ends of the spindle are journaled respectively in bushings 11 and 12 mounted in the corresponding yoke arm apertures, and an anti-friction thrust bearing 13 is interposed between the bottom of knuckle 2 and the top face of underneath yoke arm 4 to facilitate the turning of spindle 5 in response to the steering mechanism. The spindle is connected to the steering mechanism by suitable means, such as an arm 14, integral with yoke arm 4, to which is connected a rod 15 which is connected to the steering mechanism of the vehicle in a known or other suitable manner.

The structure, form and materials of the individual wheels constitutes one of the important features of the invention, and will be exemplarily described in connection with the incorporation thereof in a present preferred form of a dirigible dual wheel assembly. The hubs are of cast metal, usually steel or malleable castings, and they are provided with seats for, and bolt fastenings with the wheel bodies. The bodies are made of tapered steel discs centrally apertured to take over and be supported by their hubs, and having their greatest thickness at the hubs, and decreasing in thickness taperingly outward toward their peripheries, that is, near the locus of attachment of the wheel rims. This construction represents a most advantageous distribution of weight, a minimum of weight, and the most efficient distribution of weight for the required strength to withstand the load and road stresses between the tire and the hub. These advantages are realized and incorporated in a structure which also embodies the compactness and spaciousness of the nested hub construction, these latter features of the present embodiment being the same or similar in their general disposition and arrangement to those shown and described in my copending application Ser. No. 263,347 filed March 22, 1939.

As here embodied, the side-by-side pair of dual wheels are rotatively mounted on spindle 5, to have free rotation with respect to the spindle and with respect to each other, broad and ample bearings being provided for each wheel hub within relatively compact dimensions. As embodied, each of the wheels has its hub of ample width and diameter, one of the hubs being nested within the other, suitable anti-friction bearings and lubricating facilities being provided to adequately meet the needs and requirements of heavy-duty vehicles. As here embodied, roller bearings 22 and 23 are mounted in well spaced-apart relation on the spindle 5, the hub 24 of the outboard wheel being journaled on these bearings. Bearing 22 is held axially in position by the inner side of its inner raceway abutting on a flange 27 formed on spindle 5, the outer side of the outer raceway of bearing 22 abutting on an inwardly-projecting flange 28, formed on the interior of the hub 24. Bearing 23 is held in position axially by having the inner side of its outer raceway abutting on an inwardly-projecting flange 29 formed on the interior of the hub 24, and having the outer side of its outer raceway abutting on a nut 30 screw-threaded on the outer end of spindle 5. The hub 35 of the inboard wheel is journaled on hub 24 of the outboard wheel, for the greater part of its extent, thereby providing an ample bearing for the inboard wheel, anti-friction bushings 36 and 37 being interposed between the finished surfaces of the two hubs. Thrust bearing washers 38 and 39, located at either end of hub 35, take up the end thrust between the two wheels.

The body of the outboard wheel comprises a centrally-apertured steel disc, the aperture just fitting about the hub, the wheel being fixed to the outer end of the inner hub 24 and having the tire rim fixed to its periphery. The wheel disc is of greater thickness adjacent to the hub and tapers decreasingly outwardly toward the rim, the disc being dished or otherwise formed to best meet structural requirements and conditions. As shown, the wheel body has a central flat annular part 42 adapted to abut against the flat, annular outer face of the hub 24, the part 42 terminating in an integral, inwardly-projecting annular flange 43 that fits within the bore of the hub 24, the wheel body being clamped to the hub by screw bolts 44. The embodied rim-supporting means comprises a series of circumferentially-arranged, spaced-apart apertures in a flat annular peripheral part of the wheel body 41 into which apertures are screw-threaded bolts 48. The bolts have median beveled collars 49 formed thereon. Apertured lugs 50, which are fixed to a wheel rim 51, are supported on the bolts 48, and are held in fixed position by nuts 52, which clamp the lugs between collars 49 and the hub to hold the rim in position upon the wheel.

The body of the inboard wheel likewise comprises a centrally-apertured steel disc, which aperture slips over and closely encircles the exterior of the outer hub 35, and is fixed to the hub by means to be later described. The steel disc body of this inboard wheel is of greatest thickness adjacent to the hub and decreases in thickness taperingly outwardly toward its periphery, to which the tire rim is attached. This wheel is deeply dished so that its tire tread is equalized on the opposite side of the king pin from that of the outboard wheel, and it serves as a housing for the king-pin joint and also for the brake mechanism for both wheels. Wheel body 55 has a flat, annular portion 56 about its central aperture and when the wheel is slipped over the hub, this flat portion abuts on the flat outer side of an outwardly-extending annular flange 57 cast integral with the hub 35, the wheel body being fastened to said flange by screw bolts 58. As stated, for certain purposes the wheel body is deeply dished, and thereby constitutes a housing for the brake mechanism for both wheels and also for the king-pin joint, and extends beyond them so as to properly relate and position the tire treads. The embodied rim-supporting means for this wheel likewise comprises a series of circumferentially-arranged, spaced-apart apertures in a flat, annular, outwardly-extending peripheral portion 59 of the wheel body which terminates in a cylindrical flange 60. Bolts 61 are screw-threaded into the apertures and are provided with median beveled collars 62, which abut on the outer face of the part 59. Apertured lugs 64 are fixed to the wheel rim 65, are supported on the bolts 61 and are held in place by nuts 66. Suitable lubricating and lubricant-retaining means are provided, but need not be described in detail as they are not a part of the present invention.

Suitable braking means are provided, and as shown comprise flat, annular plates, concentric with the wheels, and fastened, respectively, to the wheels. As shown, the brake means for the inboard wheel comprises a flat, annular plate 70, which abuts on the inner face of a flat, annular flange 71 integral with the exterior of the hub 24 of the outboard wheel, the plate 70 having an annular outwardly-projecting shoulder 72 resting on the periphery of the flange 71, the plate being held thereto by screw-bolts 73. For the inboard wheel, a corresponding flat, annular plate 77 has integral therewith an inwardly-extending crown ring 78, which just fits within the wheel body 55, and is held in place by screw bolts 79, which pass through apertures in the wheel body and are screw-threaded into the ring 78. The braking means cooperating with plates 70 and 77 comprises two flat, annular, rearwardly-channeled brake shoes 82 and 83, placed back-to-back between the braking members 70 and 77, and concentric therewith. The brake shoes are held against angular or rotational movement, while free to move axially as the braking pressure is put on and taken off, and for this purpose the brake shoes have axially-disposed slots formed on their inner faces, within which are guides 86, which are supported on outwardly-projecting plates 87, fastened to the outside faces of the yoke arms 3 and 4 by tap bolts 88, the guides being fixed to said supporting members by screws 89. Means for normally maintaining the brake shoes resiliently in retracted position, for maintaining them in centered relation relatively to the brakes and to the wheel assembly, and for applying and releasing braking pressure are provided, and may be in the form shown in my copending application, Serial No. 263,347, filed March 22, 1939.

The invention in its broader aspects is not limited to the specific mechanisms shown and described but departures may be made therefrom within the scope of the accompanying claims without departing from the principles of the invention and without sacrificing its chief advantages.

What I claim is:

1. A dual wheel assembly comprising a spindle, a broad cast metal radially inner hub journaled on said spindle, a second cast metal radially outer hub encircling and journaled on said inner hub, said inner hub being longer than said outer hub, a stamped metal wheel body fixed to the outer end of said inner hub, a stamped metal wheel body fixed to the axially inner end of said outer hub, and a brake drum fixed to the inner end of said inner hub.

2. A dual wheel assembly comprising a spindle, a broad cast metal radially inner hub journaled on said spindle, a second cast metal radially outer hub encircling and journaled on said inner hub, said inner hub being longer than said outer hub, a stamped metal wheel body fixed to the outer end of said inner hub, a stamped metal wheel body fixed to the axially inner end of said outer hub, and a brake drum fixed to the inner end of said inner hub, said last-mentioned wheel body being deeply dished inwardly and enclosing said brake drum.

3. A dual wheel assembly comprising a spindle, a broad cast metal radially inner hub journaled on said spindle, a second cast metal radially outer hub encircling and journaled on said inner hub, said inner hub being longer than said outer hub, a stamped metal wheel body fixed to the outer end of said inner hub, a stamped metal wheel body fixed to the axially inner end of said outer hub, a brake drum fixed to the inner end of said inner hub, and a brake mounted on said last-mentioned wheel body.

4. A dual wheel assembly comprising a spindle, a broad metal radially inner hub journaled on said spindle, a second metal radially outer hub encircling and journaled on said inner hub, said inner hub being longer than said outer hub, a wheel body fixed to the outer end of said inner hub, a wheel body fixed to the axially inner end of said outer hub, and a brake drum fixed to the inner end of said inner hub.

CHARLES S. ASH.